W. A. LEWIS.
Wagon Axle.

No. 108,608.                              Patented Oct. 25, 1870.

Witnesses
Thos. H. Hutchins
John W. Taylor

Inventor
William A. Lewis

United States Patent Office.

WILLIAM A. LEWIS, OF JOLIET, ILLINOIS.

Letters Patent No. 108,608, dated October 25, 1870.

IMPROVEMENT IN WAGON-AXLES.

The Schedule referred to in these Letters Patent and making part of the same.

Be it known that I, WILLIAM A. LEWIS, of Joliet, in Will county and State of Illinois, have invented a new and useful Improvement in Wagon-Axles; and I do hereby declare the following to be a full, clear, and exact description of the same, reference being had to the annexed drawing making a part of this specification, in which—

Figure 1:
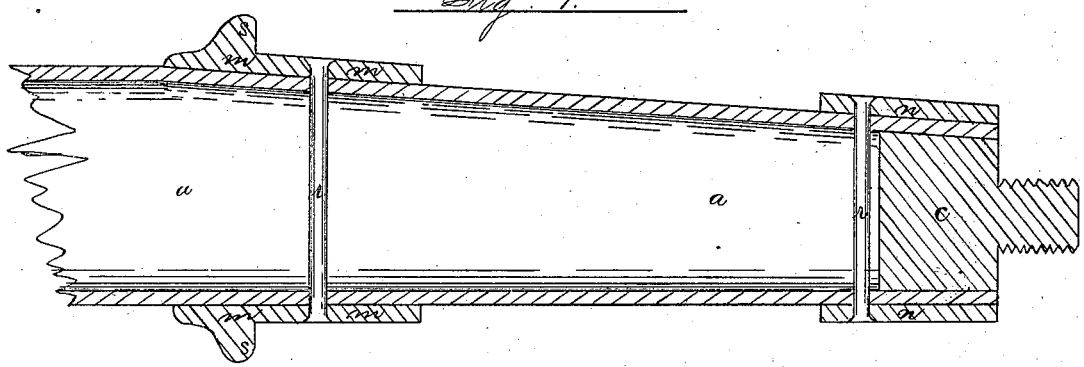
Figure 3:
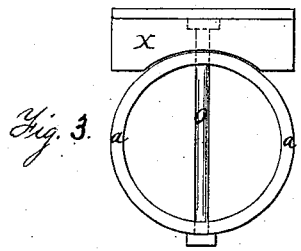

Figure 1 is a longitudinal sectional view, and
Figure 3, a cross-sectional view.

The invention consists in the peculiar construction of the axle, which I will proceed to describe.

The axle proper consists of a hollow tube, the ends of which are swaged to a taper, as shown in the drawing, to form, of itself, the axle, into the ends of which I weld or shrink in a plug, $c$, with a thread on the end for the nut, or the nut $o$ may be held by a linch-pin, as shown in the drawing.

$m$ and $n$ are bearings which are slipped on over the axle, and are constructed of steel or other very hard metal, and are fastened in place by bolts $r\ r$ passing through, as shown in fig. 1.

The bearing $m$ is constructed with a shoulder, $s$, to hold the hub of the wheel in place.

The bearings $m$ and $n$ are intended to be replaced by new ones whenever they get worn, so the axle never gets worn out, and is easily repaired.

In order to hold the hounds firm on the axle I use a metal saddle, $x$, resting on the axle $a$, and held in place by means of the bolt $o$, as shown in fig. 3. This fastening is necessary, because it would not do to bolt the wood immediately on the axle, for it would be continually getting loose. The hounds rest on the metal seat between the flanges thereon, to hold it firm, as shown.

Claims.

Having thus described my invention,
What I claim as new, and desire to secure by Letters Patent, is as follows:

1. The bearings $m$ and $n$, and plug $c$, in combination with the swaged tube-axle $a$, constructed and operating as set forth.
2. The metal saddle $x$, attached to the axle $a$ by means of the bolt $o$, for the purpose of holding the hound, as shown.

WILLIAM A. LEWIS.

Witnesses:
THOS. H. HUTCHINS,
HENRY LOWE.